United States Patent
Litvak et al.

(10) Patent No.: US 9,330,307 B2
(45) Date of Patent: May 3, 2016

(54) LEARNING BASED ESTIMATION OF HAND AND FINGER POSE

(71) Applicant: Apple Inc., Cupertino, CA (US)

(72) Inventors: Shai Litvak, Beit Hashmonai (IL); Leonid Brailovsky, Herzliya (IL); Tomer Yanir, Rinatya (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/636,281

(22) Filed: Mar. 3, 2015

(65) Prior Publication Data
US 2015/0186716 A1 Jul. 2, 2015

Related U.S. Application Data

(63) Continuation of application No. 13/786,508, filed on Mar. 6, 2013, now Pat. No. 9,002,099.

(60) Provisional application No. 61/609,386, filed on Mar. 12, 2012.

(51) Int. Cl.
*G06K 9/00* (2006.01)
*G06K 9/46* (2006.01)

(52) U.S. Cl.
CPC ........ *G06K 9/00382* (2013.01); *G06K 9/00201* (2013.01); *G06K 9/4671* (2013.01)

(58) Field of Classification Search
USPC ................. 382/103, 107, 128, 154, 282, 115; 345/653, 664, 474
See application file for complete search history.

(56) References Cited

U.S. PATENT DOCUMENTS

| | | | | |
|---|---|---|---|---|
| 7,372,977 B2* | 5/2008 | Fujimura | ........... | G06K 9/00369 382/103 |
| 7,457,733 B2* | 11/2008 | Maille | .................... | G06T 13/40 700/255 |
| 7,489,806 B2* | 2/2009 | Mohri | .................... | G06F 3/014 382/103 |
| 7,590,262 B2* | 9/2009 | Fujimura et al. | ............... | 382/104 |
| 8,351,651 B2* | 1/2013 | Lee | ............................. | 382/103 |
| 8,428,311 B2* | 4/2013 | Dariush | .................... | G06K 9/48 382/115 |
| 8,497,838 B2* | 7/2013 | Langridge | ..................... | 345/157 |
| 8,730,157 B2* | 5/2014 | Sankarasubramaniam et al. | ............................. | 345/156 |
| 8,811,719 B2* | 8/2014 | Wilson et al. | ................. | 382/154 |

* cited by examiner

*Primary Examiner* — Yosef Kassa
(74) *Attorney, Agent, or Firm* — D. Kligler IP Services Ltd.

(57) ABSTRACT

A method for processing data includes receiving a depth map of a scene containing a human hand, the depth map consisting of a matrix of pixels having respective pixel depth values. The method continues by extracting from the depth map information based on the depth values in a plurality of positions distributed over the human hand and processing the information in order to estimate respective candidate positions of the finger joints. The pose of the human hand is estimated by choosing a combination of the positions of the finger joints, responsively to anatomical constraints of the hand, that gives a hand configuration that is most anatomically probable among the candidate positions.

20 Claims, 3 Drawing Sheets

LEARNING BASED ESTIMATION OF HAND AND FINGER POSE

CROSS-REFERENCE TO RELATED APPLICATIONS

This application is related to U.S. patent application Ser. No. 13/229,727, filed Sep. 11, 2011, which is incorporated herein by reference.

This application is a continuation of U.S. patent application Ser. No. 13/786,508, filed Mar. 6, 2013, which claims the benefit of U.S. Provisional Patent Application 61/609,386, filed 12 Mar. 2012, which is incorporated herein by reference.

FIELD OF THE INVENTION

The present invention relates generally to methods and systems for three-dimensional (3D) mapping, and specifically to extracting high-level information from depth-map data.

BACKGROUND OF THE INVENTION

A number of different methods and systems are known in the art for creating depth maps. In the present patent application and in the claims, the term "depth map" refers to representation of a scene as a two-dimensional matrix of pixels, in which each pixel corresponds to a respective location in the scene and has a respective pixel depth value, indicative the distance from a certain reference location to the respective scene location. (In other words, the depth map has the form of an image in which the pixel values indicate topographical information, rather than brightness and/or color of the objects in the scene.) Depth maps may equivalently be referred to as 3D maps, depth images, or 3D images.

Depth maps may be created by various techniques, such as by detection and processing of an image of an object onto which a pattern is projected. Methods of depth mapping of this sort are described, for example, in PCI International Publications WO 2007/043036 A1, WO 2007/105205 and WO 2008/120217, as well as in U.S. Patent Application Publication 2010/0007717, whose disclosures are incorporated herein by reference. Depth maps may alternatively be created by stereoscopic methods or by time-of-flight measurements, as well as by other methods that are known in the art.

Depth maps may be processed in order to segment, identify and localize objects and their components in the scene. Identification of humanoid forms (meaning 3D shapes whose structure resembles that of a human being) in a depth map, and the exact poses of these forms, which may change from frame to frame, may be used as a means for controlling computer applications. For example, PCT International Publication WO 2007/132451, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

U.S. Patent Application Publication 2011/0211754, whose disclosure is incorporated herein by reference, describes a method for tracking body parts by combined color image and depth processing. A part of the body of a subject is identified in at least one of depth image of a scene containing a human subject and receiving a color image of the scene containing the human subject. A quality of both the depth image and the color image is evaluated, and responsively to the quality, one of the images is selected to be dominant in processing of the part of the body in the images. The identified part is localized in the dominant one of the images, while using supporting data from the other one of the images.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

SUMMARY

An embodiment of the present invention provides a method for processing data, including:

receiving a depth map of a scene containing a human hand, the depth map including a matrix of pixels having respective pixel depth values;

extracting from the depth map respective descriptors based on the depth values in a plurality of patches distributed in respective positions over the human hand;

matching the extracted descriptors to previously-stored descriptors in a database; and estimating a pose of the human hand based on stored information associated with the matched descriptors.

Typically, estimating the pose includes applying kinematics based on anatomical constraints of the hand in processing the descriptors.

In a disclosed embodiment the method includes receiving a color or grayscale image of the human hand, and extracting the descriptors includes incorporating information from the color or grayscale image in the descriptors together with the depth values.

In a further disclosed embodiment estimating the pose includes detecting that a part of the hand is occluded in the depth map, and excluding the occluded part from estimation of the pose. Typically, estimating the pose includes choosing a most anatomically probable hand configuration in response to detecting that the part of the hand is occluded.

In a yet further disclosed embodiment estimating the pose includes expressing the pose in terms of a hand posture description language. The hand description language may include assigning one of a set of positions to each finger of the hand so as to define postures of the hand. Defining postures of the hand may include defining one or more invalid postures of the hand, and estimating the pose of the hand may include excluding the one or more invalid postures.

In an alternative embodiment the previously-stored descriptors in the database are associated with corresponding pointers to respective locations of anatomical landmarks on the human hand, and estimating the pose includes applying the pointers to the respective positions of the patches from which the matching descriptors were extracted in order to estimate the locations of the landmarks.

Typically, the landmarks include at least one element selected from a group including a fingertip, a joint, a palm plane, and a base of the hand. Estimating the pose may include reconstructing the pose by applying reverse kinematics using at least one of the locations of the landmarks. The method may include creating the database by processing a set of training maps in which ground-truth locations of the anatomical landmarks are indicated in order to find the corresponding pointers. Alternatively or additionally, estimating the pose may include associating respective weights with the estimated locations of the landmarks, and applying a weighted voting process using the weights to find the locations of the landmarks.

Associating the respective weights may include computing the weights based on at least one weighting term that is selected from a group of weighting terms consisting of:

a similarity term, based on a descriptor distance between the matched descriptors;

a patch distance term, based on a Euclidean distance between a patch position and a landmark location;

a landmark distance term, based on a landmark distance between a given landmark location and a parent landmark location that has already been estimated;

a predictive term, based on a previous landmark location derived from a preceding depth map;

a variance term, based on a variance of the landmark location determined in creating the database;

a bone length term, based on a length-difference between a current estimated bone length and an expected bone length derived from locations of joints of a given bone; and a bone angle term, based on an angle-difference between a current estimated bone angle and an expected bone angle of the given bone derived from anatomical constraints.

Typically, associating the respective weights includes assessing a reliability of the patches providing the estimated locations, and assigning reliability values to the estimated locations based on the assessed reliability.

The method may include normalizing a depth of the depth map by finding a representative depth coordinate of the human hand in the depth map and projecting a point cloud derived from the depth map responsively to the representative depth coordinate, and applying the normalized depth in matching the descriptors and estimating the pose.

Estimating the pose may include finding respective locations of landmarks of the human hand, and the method may further include calibrating a scale of the human hand by finding a distance between the locations of the landmarks and scaling the depth map responsively to the distance, and applying the calibrated scale in matching the descriptors and estimating the pose.

In a further alternative embodiment receiving the depth map includes receiving a sequence of depth maps, and estimating the pose includes tracking movement of the human hand over multiple frames in the sequence. The method may also include controlling a computer application responsively to the tracked movement.

There is further provided, according to an embodiment of the present invention mapping apparatus, including:

an imaging assembly, which is configured to provide a depth map of a scene containing a human hand, the depth map including a matrix of pixels having respective pixel depth values; and a processor, which is configured to extract from the depth map respective descriptors based on the depth values in a plurality of patches distributed in respective positions over the human hand, to match the extracted descriptors to previously-stored descriptors in a database, and to estimate a pose of the human hand based on stored information associated with the matched descriptors.

There is further provided, according to an embodiment of the present invention a computer software product, including a computer-readable medium in which program instructions are stored, which instructions, when read by a computer, cause the computer to receive a depth map of a scene containing a human hand, the depth map including a matrix of pixels having respective pixel depth values, to extract from the depth map respective descriptors based on the depth values in a plurality of patches distributed in respective positions over the human hand, to match the extracted descriptors to previously-stored descriptors in a database, and to estimate a pose of the human hand based on stored information associated with the matched descriptors.

The present invention will be more fully understood from the following detailed description of the embodiments thereof, taken together with the drawings in which:

DETAILED DESCRIPTION OF EMBODIMENTS

Overview

Depth maps provide a wealth of information, particularly when they are presented in a continuous stream over time. To use this information in games and other applications based on depth maps, however, one must deal with the difficulties inherent in capturing, processing, and extracting high-level information from such maps. Finding and tracking the parts of a moving humanoid form in a sequence of depth maps, and specifically of a human hand, is a particular challenge.

Embodiments of the present invention that are described hereinbelow provide robust, efficient methods, systems and software for extracting hand pose from depth maps. In particular, the disclosed embodiments build on and improve upon the methods described in the above-mentioned U.S. patent application Ser. No. 13/229,727. The disclosed methods apply a patch-based (compositional) learning method for pose estimation from depth-map data. This method allows even poses that were not learned previously to be composed from learned pose segments in the processed depth map.

The disclosed methods are directed particularly to reconstructing a "skeleton" of a 3D form that is believed to correspond to a human hand. Such a skeleton is a schematic model that includes the fingertips, finger joints, and base of the hand, and indicates their respective locations. The relative locations of the joints in the hand define a "pose" of the hand. The parameters and motion of such a skeleton can serve as a simplified input to application programs, enabling such programs to respond to users' gestures and hand posture.

In the embodiments disclosed below, the pose of a hand is estimated using local descriptors, which are based on local statistics in spatial bins of patches in a depth map. In one embodiment, the descriptors refer to "2.5D" depth patches and combine depth-edge counts with representative depth values (such as mean values) in a set of bins that are arrayed around the center point of the patch. These patches and their descriptors serve as the basis for non-parametric learning and corresponding detection, by searching a descriptor database, typically using an Approximate Nearest Neighbors (ANN) algorithm. The results of this search serve as inputs to a weighted voting process, which finds the locations of anatomical landmarks, such as joints of the hand, with high reliability. Specifically, each ANN query result is weighted based on several factors, including a hand model. As will be apparent from the description below, a descriptor is an n-dimensional element or matrix that may be considered to be located in a corresponding n-dimensional descriptor space. Typically the number of dimensions n associated with a descriptor is of the order of eighty, but the number may be larger or smaller than eighty.

Although the techniques of body skeleton reconstruction that are applied in the above-mentioned U.S. patent application Ser. No. 13/229,727 may generally be adapted for hand skeleton reconstruction, there are a number of aspects of hand skeleton reconstruction that require special consideration. For example, the hand skeleton has a larger number of joints, and therefore more degrees of freedom, than the body skeleton, which makes hand reconstruction more difficult and error-prone. Furthermore, in many common hand postures, parts of the hand and fingers may be occluded by other parts. On the other hand, the mechanical structure of the hand is more rigid than the full body, in the sense, for example, that the finger joints are constrained to rotate in the same plane, and the shape of the palm generally does not change.

Embodiments of the present invention take advantage of these constraints in enhancing the robustness of hand reconstruction, so that hand posture can be found reliably even from only partial input data, for instance, when a part of the hand is occluded. For example, the estimation process may provide several best candidates for each finger joint location, and a search over different combinations of the candidate joint positions may then be performed to choose the combination that gives the most anatomically probable hand configuration.

Although low-cost depth sensors can be very effective for segmentation and localization of clearly distinct fingers, such sensors typically have low resolution and large minimal object size by comparison with conventional RGB and grayscale cameras of similar cost. Moreover, luminance edges may be, at least in some cases, more clearly visible than corresponding depth edges. For these reasons, in some embodiments, depth and color or grayscale image information may be combined in estimating hand pose, as described, for example, in the above-mentioned U.S. Patent Application Publication 2011/0211754.

System Description

Figures 1, 2, 3:
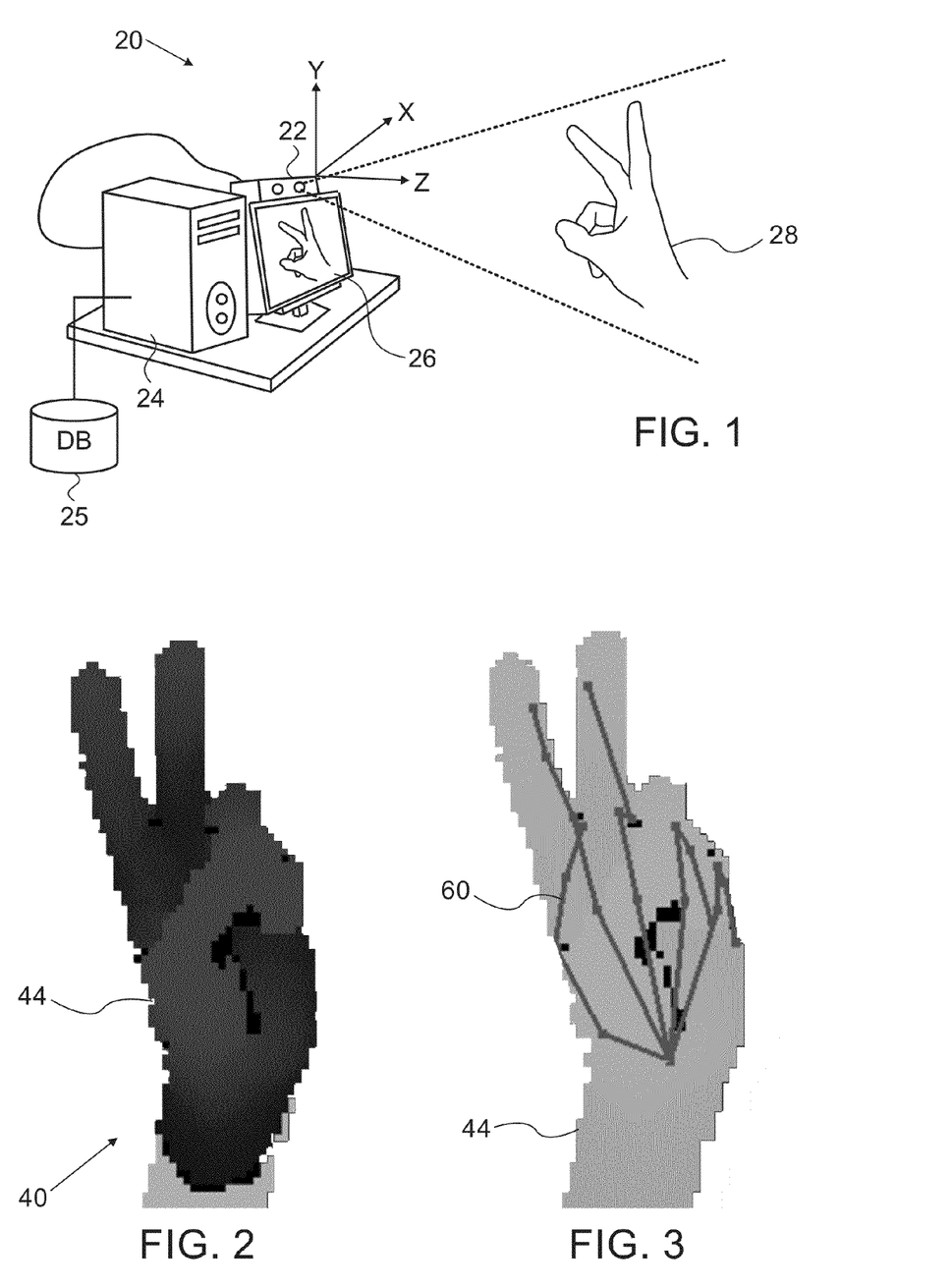
FIG. 1 is a schematic, pictorial illustration of a system for 3D mapping and tracking of a human hand, in accordance with an embodiment of the present invention.
FIG. 2 is a schematic representation of a depth map of a hand, in accordance with an embodiment of the present invention.
FIG. 3 is a schematic image showing an estimated hand skeleton superimposed on the hand in the depth map of FIG. 2, in accordance with an embodiment of the present invention.

FIG. 1 is a schematic, pictorial illustration of a 3D user interface system 20, in accordance with an embodiment of the present invention. The user interface is based on a 3D imaging assembly 22, which captures 3D scene information that includes at least a hand 28 of a human user. Details of a 3D imaging assembly of this sort are described, for example, in PCT International Publication WO 2010/004542, whose disclosure is incorporated herein by reference. Assembly 22 captures the hand images with sufficient resolution to enable the fingers and their respective positions to be distinguished. Assembly 22 typically captures images of other parts of the user's body, as well, or possibly all of the body, and may have either zoom capabilities or a dedicated sensor with enhanced magnification to capture images of the hand with the desired resolution. Assembly may also capture 2D color video images of hand and other elements of the scene.

Assembly 22 outputs a sequence of frames containing 3D map data (and possibly color image data, as well) to a computer 24, which extracts high-level information from the map data. This high-level information is typically provided via an Application Program Interface (API) to an application running on computer 24, which drives a display screen 26 accordingly. For example, the user may interact with game software running on computer 24 by moving his hand 28 and changing his hand posture.

In one embodiment, assembly 22 projects a pattern of spots onto a scene containing hand 28 and captures an image of the projected pattern. Assembly 22 or computer then computes the 3D coordinates of points in the scene (including points on the surface of the user's body) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in the references cited above in the Background section. In the present disclosure, assembly 22 is assumed to define an orthogonal set of xyz axes, so that depth coordinates of points in the scene correspond to z components measured by the assembly.

Alternatively, system 20 may use other methods of 3D mapping, such as stereoscopic imaging or time-of-flight measurements, based on single or multiple cameras or other types of sensors, as are known in the art.

In the embodiment shown in FIG. 1, system 20 captures and processes a temporal sequence of depth maps containing the user's hand, while the user moves his hand. Software running on a processor in assembly 22 and/or computer 24 processes the 3D map data to extract patch descriptors of the hand in these depth maps, as explained in detail hereinbelow. The software matches these descriptors to patch descriptors stored in a database 25, based on a prior learning process, in order to estimate the pose of the hand in each frame. The pose typically includes 3D locations of the user's hand joints.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion and gesture information are provided via the above-mentioned API to an application program running on computer 24. This program may, for example, move and modify images presented on display 26 in response to the pose and/or gesture information.

Computer 24 typically comprises a general-purpose computer processor, which is programmed in software to carry out the functions described hereinbelow. The software may be downloaded to the processor in electronic form, over a network, for example, or it may alternatively be provided on tangible, non-transitory media, such as optical, magnetic, or electronic memory media. Database 25 is likewise stored in a memory associated with the computer. Alternatively or additionally, some or all of the described functions of the computer may be implemented in dedicated hardware, such as a custom or semi-custom integrated circuit or a programmable digital signal processor (DSP). Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly.

As another alternative, at least some of these processing functions may be carried out by a suitable processor that is integrated with display screen 26 (in a television set, for example) or with any other suitable sort of computerized device, such as a game console or media player. The sensing functions of assembly 22 may likewise be integrated into the computer or other computerized apparatus that is to be controlled by the sensor output.

FIG. 2 is a schematic representation of a depth map 40 captured by assembly 22, in accordance with an embodiment of the present invention. The depth map, as explained above, comprises a matrix of pixels having respective depth values. The pixels corresponding to a hand 44 have been segmented out from the background and the wrist in this map. The brightness of each pixel within the hand in FIG. 2 corresponds inversely to its depth value, i.e., the measured z distance from assembly 22, with the shade of gray growing darker with increasing depth. Computer 24 processes these depth values in order to identify and segment a component of the image (i.e., a group of neighboring pixels) having characteristics of a human hand. These characteristics, may include, for example, overall size, shape and motion from frame to frame of the sequence of depth maps. Methods for identification and segmentation of such forms in sequences of depth maps are described, for example, in U.S. Patent Application Publication 2011/0293137, whose disclosure is incorporated herein by reference.

FIG. 3 schematically illustrates a hand skeleton 60 that computer 24 ultimately extracts from the depth map of FIG. 2, in accordance with an embodiment of the present invention. In FIG. 3 the skeleton is superimposed on hand 44 that has been segmented from the original depth map. The steps involved in extracting this skeleton are described below.

Figure 4A:
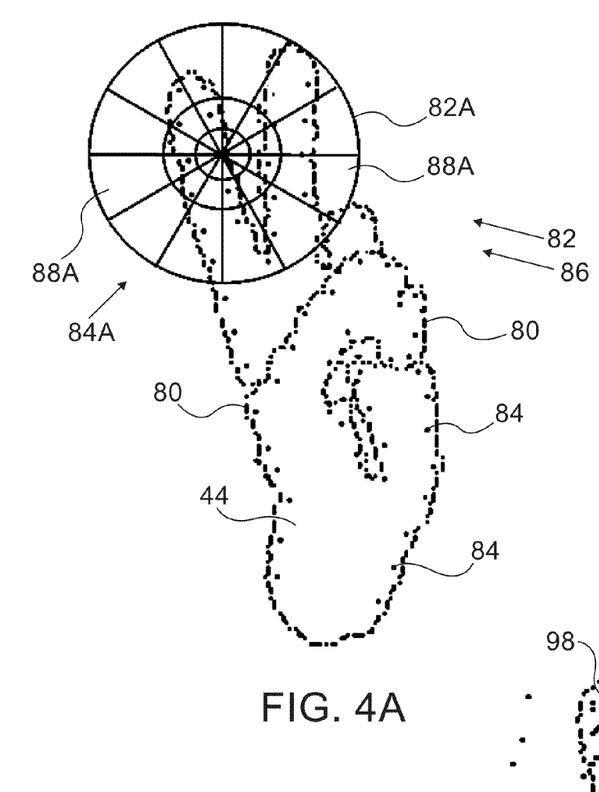
FIG. 4A is a schematic image showing descriptor centers and a descriptor patch used in estimating the pose of the hand of FIG. 2, in accordance with an embodiment of the present invention.
Figure 4B:
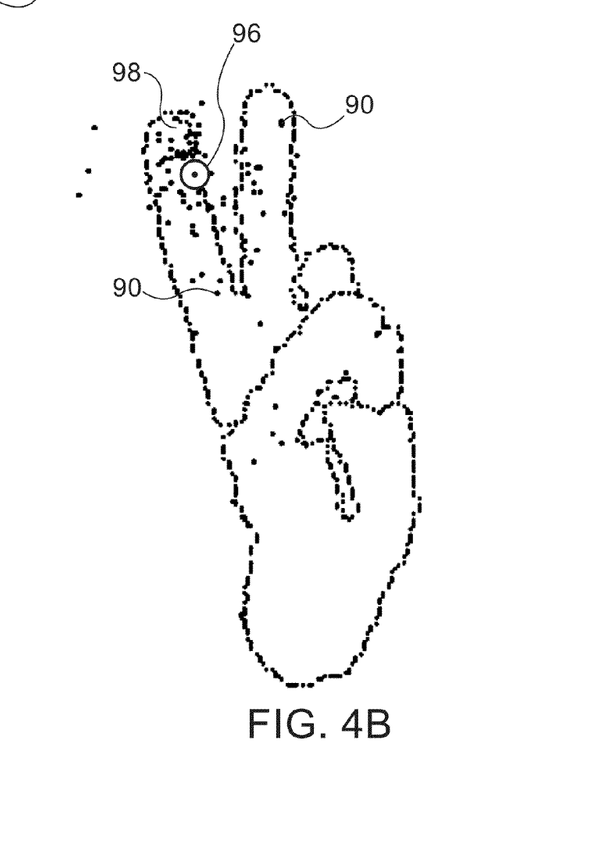
FIG. 4B is a schematic image showing a point cloud corresponding to the estimated location of the joint of the index finger of the hand of FIG. 2, in accordance with an embodiment of the present invention.

FIG. 4A is a schematic diagram of a segmented hand, in accordance with an embodiment of the present invention. To segment hand 44, computer 24 may identify depth edges 80, as is illustrated in the figure. The segmented hand may also be scaled to a default hand size (and this is the reason why the hand in FIGS. 4A and 4B is larger than in FIGS. 2 and 3).

Following segmentation of the hand, computer 24 defines an array of patches 82 extending over all or part of the hand. Center points 84 of these patches are shown as dots in FIG. 4A. In the disclosure, elements referred to in the disclosure, such as patches 82 and center points 84, are differentiated as necessary by appending a letter A, B, C, . . . to the identifying numeral. By way of example, the overall area of a patch 82A in the array is shown as a circle centered on a point 84A along the edge of the index finger. For simplicity and clarity, only patch 82A is shown in the figure, but it will be understood that there is a patch centered on each point 84.

Each patch 82 contains a predefined area within the depth map, and is centered on a respective center point 84. Each patch 82 is typically subdivided into spatial bins 86, illustrated by radial segments 88A of patch 82A in FIG. 4A. Such bins are illustrated and described in greater detail in the above-mentioned U.S. patent application Ser. No. 13/229, 727. Computer 24 typically processes many overlapping patches 82 of this sort, each centered on a different point 84. Although patch 82A shown in FIG. 4A is round, the patches may alternatively be square or may have any other suitable shape. Patches 82, and their corresponding center points 84, may be distributed uniformly over the area of the hand, or alternatively, the patches may be non-uniformly distributed. For example, center points 84 may be concentrated along and in the vicinity of depth-edges, as is illustrated in FIG. 4A.

Computer 24 computes a descriptor for each patch, as described below, and matches the descriptors to previously-stored descriptors in database 25. Each of these stored descriptors has been extracted using a known location on a human hand and is associated with pointers to the locations of joints in the hand, or to other landmarks of the hand, as explained below. The rotation of all the descriptors may be normalized such that the orientation of the hand as a whole is roughly constant, with the base of the palm at the bottom, for example.

FIG. 4B is a schematic diagram of estimated joint locations 90 of hand 44, in accordance with an embodiment of the present invention. The pointers associated with the matching descriptors are used to generate a "cloud" of estimated joint locations 90, illustrated in FIG. 4B as dots. Computer 24 typically performs a weighted voting process using these estimated joint locations to provide a best estimate of a specific joint location, and thus is able to reconstruct skeleton 60 (FIG. 3) of the hand. For example, in FIG. 4B, the cloud corresponds to estimated locations 90 of the index fingertip joint, and a circle 96 indicates the location with highest density, which is taken to be the fingertip joint location. In addition, from skeleton 60 a location 98 of the index fingertip itself may be estimated.

Computation of 2.5D Descriptors

To compute descriptors, each patch is divided into an array of sub-areas, referred to as spatial bins. Computer 24 extracts a respective descriptor for each patch by computing a certain numerical value or values for each bin, typically depending on the depth edges and depth statistics in each bin. The computer generates the descriptor of each patch as a vector of these different bin values. Details of this computation are described below.

To compute the descriptor elements, computer 24 extracts depth edges of the segmented hand, as shown in FIG. 4A. Any suitable method that is known in the art may be used to extract the depth edges. For example, computer 24 may take a derivative of the depth map in FIG. 2 and then connect together neighboring pixels having similar derivative values until a complete edge has been defined. As another example, the computer may apply a Canny edge detector to the depth map. The above-mentioned WO 2007/132451 also describes methods that may be used in this context.

After extracting the depth edges, computer 24 computes depth-edge statistics in each bin. For example, the computer may count the number of pixels in each bin that are classified as edge pixels. The direction of the edge and its polarity (positive or negative, from a distant object or background to a nearer body part, or vice versa) may also be used as part of the depth-edge descriptor. For example, the mean or median direction in each bin can be computed. Additionally or alternatively, computer 24 may find ridges (contiguous sets of local maxima) in the depth map, and use the ridge locations and/or directions in computing descriptor elements.

In addition, computer 24 may extract a representative depth value for each bin and may use this value to compute a corresponding descriptor element. Unlike the edge-related values, which are derived from only a relatively small subset of the pixels in each bin (the pixels that fall on depth-edges), the depth values may represent depth information from all the pixels in the bins. Alternatively, a sparse (random or fixed) sample of pixels from each bin may be used in computing the representative depth values. Furthermore, whereas the edge- or ridge-related statistics relate to pre-processed depth information, the depth-related statistics refer simply to the depth itself. The representative depth values may be, for example, the mean depth value or, alternatively, a variance, a median or a mode value. Outliers may be removed before calculating the statistics in order to improve the robustness to noise. In addition, a function of the representative value, such as a log or power, can be used to improve the robustness of the descriptor.

The bins used in computing the depth values may be the same as those used for the edge values, or alternatively different bins may be used. The bins may contain distinct geometrical spaces, or alternatively, the bins used in computing the depth and/or depth-edge statistics may overlap one another.

The descriptor for each patch typically comprises an array of bin edge values in the corresponding descriptor elements, concatenated with an array of bin depth values in the remaining descriptor elements to form a single vector. The bins may be weighted and normalized to give a desired balance between depth-edge and/or depth-ridge and depth information and to compensate for differences in bin areas, and possibly to emphasize the values of certain bins within the patch. The resulting descriptor is referred to herein as a "2.5D" descriptor, in the sense that it represents the 3-dimensional form of the subject but refers only to the surface of the form appearing in the depth map, rather than full 3D voxel-oriented information. Alternatively or additionally, the descriptors may comprise other types of information, based on other methods of extracting data from the depth maps and/or other methods of processing the extracted data, or based on 2D color or grayscale images, or on IR (infra-red) images.

In some cases, local bin information with regard to depth, edges or ridge content may not be sufficiently distinctive to identify the hand pose. For example, a patch that covers the third, fourth and fifth fingers may be similar to a patch that covers the second, third and fourth fingers. To distinguish between the two patches, relative properties of a patch with respect to its surroundings, referred to herein as "semi-global information," can be coded as additional features of its descriptor. Such semi-global information can include, for example:

The distance and angle of the (x,y) patch center from the (x,y) center of mass of the hand (with size and depth normalized based on the depth map).

The distance in the horizontal direction of the leftmost (rightmost) segmented hand pixel in the patch from the leftmost (rightmost) segmented pixel in the entire hand. Similarly, the distance in the vertical direction of the topmost segmented hand pixel in the patch from the topmost segmented pixel in the entire hand (assuming normalization of rotation, as described above).

The distance in depth between the nearest (or most distant) patch pixel and the nearest (or most distant) hand pixel.

The hand rotation in the x-z plane.

As noted earlier, a possible limitation of depth maps provided by a low-cost depth sensor is that fine details of the hand, which are relevant for detection of certain poses and gestures, are not available due to accuracy limitations of the depth map. For example, when two (or more) fingers are pointing straight up and touching each other, the depth of the valley between the fingers is only few millimeters. Depth edges extracted from the depth map may be noisy, resulting in reduced detection accuracy. At the same time, the minimal object size of low-cost depth sensors is typically large. When the hand is relatively distant from the assembly 22 (for example, above 1.5 meters), some or all of the fingers in the depth-map may be merged into one object, even when the fingers are slightly spread.

To overcome these limitations, in some embodiments, 2D image (color, grayscale or IR) information is combined with the depth information. The 2D image is first registered with the depth-map, and is then scaled and rotated using the same transformation calculated for the depth map. The 2D image is then segmented using the same segmentation mask applied to the depth map (as described hereinbelow with reference to step 120 in FIG. 6). The result is an image of the segmented hand that corresponds to the scaled and rotated depth map of the hand.

After this preprocessing step, local information is calculated for each image patch and is included as additional features of the descriptor. For example, edges extracted from the 2D image, can be processed in a similar manner to depth edges as described above (count edge pixels in each bin, and take the mean edge orientation). Image edges between fingers are often more easily visible and less noisy than the depth edges. Optionally, the image edge information and depth edge information can be combined. For example, in each bin, the edge direction of pixels from both edge maps can be averaged. Alternatively or additionally, other features such as SIFT (Scale Invariant Feature Transform), SURF (Speed Up Robust Feature), HOG (Histogram of Oriented Gradients), interest points and corners (e.g., based on a Harris operator), as well as other methods of image feature extraction, can be used and added to the descriptor. A quantitative evaluation of the quality of the information arriving from a specific data source (depth, 2D or IR) may be used to weight or otherwise affect the contribution of the corresponding feature values during the approximate search of nearest neighbor descriptors in the database.

A fused depth-image descriptor, such as is described above, is typically more informative than the depth-only descriptor due to the different information encoded by depth maps and by 2D images. In addition, a 2D camera will typically have a resolution much higher and a minimal object size much smaller than those of a depth sensor of similar cost. Thus, high-accuracy hand pose estimation can be achieved using a low-cost combination of image and depth sensors. Typically, the segmentation and low-resolution details are dominated by the depth information, while the fine details are dominated by the image information.

Descriptors of the types described above are used first in a learning phase, to build database 25, and then in a detection phase. The learning phase uses a large set of training data, comprising depth maps of hands in different poses, with "ground-truth" information for each depth map. The ground-truth information may identify actual locations of anatomical landmarks on the hand, such as the fingertips, base of the hand (wrist position), joints, palm plane, and/or other landmarks on the hand. Knowledge of some or all of these locations enables the computer to reconstruct the full hand position by inverse kinematics. The locations on the hand may be identified in the learning phase, for example, by fixing markers to different points on the hand (or to a glove worn on the hand), and then automatically identifying the markers and their respective locations in each depth map by image processing. (In the detection phase, the subjects do not generally wear such markers, and the hand locations are derived from the patch descriptors, as described below.)

For each patch in each of the training maps, computer 24 calculates, in addition to the descriptor that was described above, a vector distance from the patch center to the ground-truth location of each of the landmarks on the hand (or at least some of the landmarks). The computer stores this information in database 25 together with the descriptors.

Alternatively or additionally, the ground-truth information may be provided in terms of functional features, such as the angles of the finger joints and wrist. The computer may apply forward kinematics to reconstruct a complete hand model based on some or all of these angles. The hand model may be expressed in simplified terms using a "hand posture description language," in which each finger is flexed, semi-flexed or open. This sort of language is useful, inter alia, in providing simple descriptions of static hand gestures. An Appendix to this disclosure describes a hand posture description language which may be used in embodiments of the present invention.

In the pose estimation phase, computer 24 matches the input patch descriptors that are extracted from the current depth map to the descriptors in database 25. For each patch retrieved from database 25, the computer also retrieves the associated landmark distance vectors and/or other relevant ground-truth information. Thus, after matching the patch centered at a given point in the depth map to the patch in the database that is centered at a certain ground-truth point, computer 24 applies the vector that was computed to the position of this patch to find the estimated locations of the anatomical landmarks. The computer likewise collects estimated landmark locations from other patches in order to form a cloud, and then finds the actual landmark location of the hand based on this cloud, typically by a weighted voting process, as described below. A similar approach is used to find all the landmark locations.

Learning-Based Pose Estimation

Learning Phase

Figure 5:
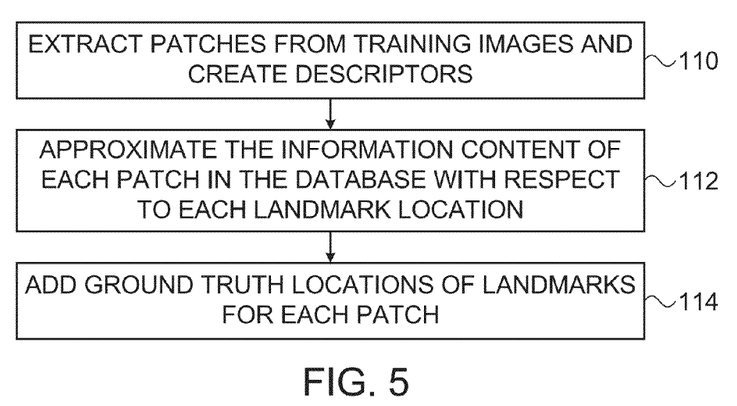
FIG. 5 is a flow chart that schematically illustrates a method for building a patch database, in accordance with an embodiment of the present invention.

FIG. 5 is a flow chart that schematically illustrates a method for building patch descriptor database 25, in accordance with an embodiment of the present invention. This method represents a learning phase, to be followed by a detection phase, which is described below with reference to FIG. 6.

The learning phase has three main steps:

In a patch extraction step 110, computer 24 (or another computer) scans the training set of depth maps and extracts multiple depth patches from each segmented hand. The computer calculates a descriptor for each patch, as described above, as well as distances from the patch center to ground-truth locations. The result of this process is a database of patch descriptors.

In an information assessment step 112, the computer calculates the information content of descriptors in the database. For this purpose, the computer may go over all patches in the database and process them as follows, for each patch P:
1. Find all other "similar" patches, meaning patches whose $L_2$ (Euclidean) distance from P in the descriptor space is below a parameter R. (All these patches are contained in a hypersphere of radius R in the descriptor space.)
2. For each landmark J, calculate the location variance $V_{P,J}$ over all ground-truth locations associated with the similar patches. This variance roughly corresponds to the information content of the descriptor of P with respect to the location of J. Low variance indicates high information content of the patch with respect to the landmark. This variance is later used during the detection phase (see below).
3. Remove from the database all similar patches to P, but keep P or an alternative representative of the patches that fell within the hypersphere.

Once the entire database has been processed in this manner, the computer augments the database as follows, in an augmentation step 114, for each of the patches in the database:
1. Add to the database the vector distances to the ground-truth locations of all anatomical landmarks in the full depth map from which the patch was taken.
2. Save the variance value $V_{P,J}$ that was calculated for each landmark whose location is added to the database, as long as the variance is less than a given threshold θ.

Alternatively or additionally, as noted above, the patches may be associated with ground-truth information with respect to joint angles.

Detection Phase

Figure 6:
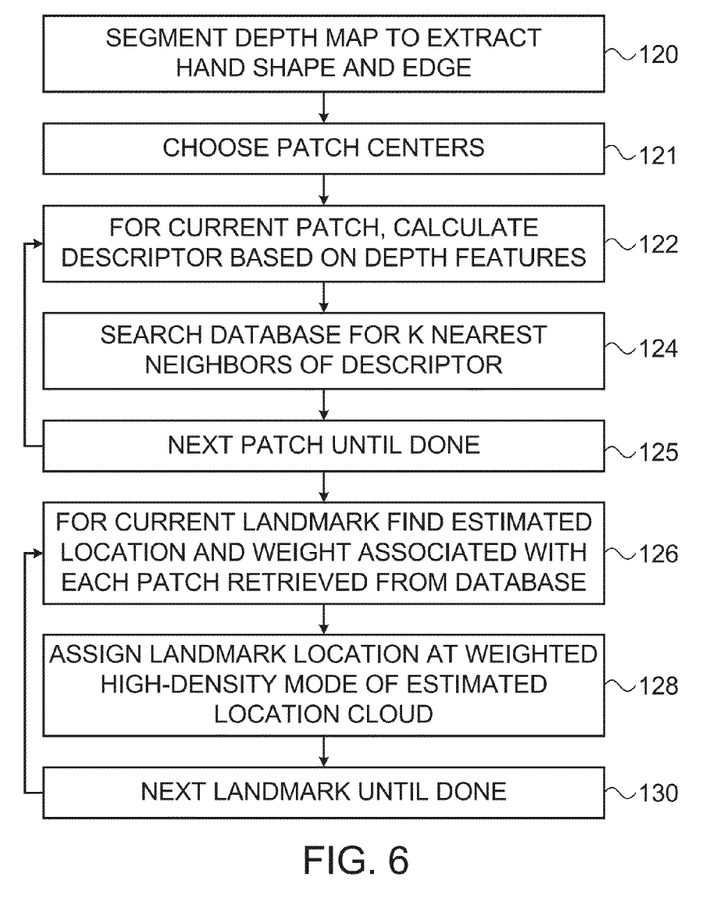
FIG. 6 is a flow chart that schematically illustrates a method for patch-based pose estimation, in accordance with an embodiment of the present invention.

FIG. 6 is a flow chart that schematically illustrates a method for patch-based pose estimation based on a depth map, in accordance with an embodiment of the present invention. This figure represents the detection phase.

In a segmentation step 120, computer 24 segments the input depth map to extract a hand, as illustrated in FIG. 2. The result is a depth map in which all depth pixels other than the hand are marked as "no-hand." The computer then calculates a depth-edge map (in which each depth pixel contains a value associated with the smoothed local direction of the edge) from the segmented depth map. Methods for segmentation and edge extraction were described above.

As part of the segmentation step, computer 24 may normalize the scale of the depth map in order to reduce spurious variations in the apparent size of the hand due to variations in the distance of the user from imaging assembly 22. For this purpose, the computer may, for example, translate pixels from the depth map (using standard projective geometry) to a point cloud in real-world coordinates representing the hand. The point cloud is shifted, using a fixed dz, so that the center of mass is at a target "standard" depth. The computer scales the point cloud (along all axes) using a previously-estimated hand scaling factor, so that the resulting point cloud represents a hand of "standard" size. The computer projects the resulting point cloud to create a new depth map, which now represents a default hand at a default distance. Following this sort of depth normalization, both the detection and learning phases become substantially invariant in both hand size and location. The depth normalization performed at this step may be combined with scale normalization, as described in the above-mentioned U.S. patent application Ser. No. 13/229,727, mutatis mutandis.

Such depth and/or scale normalization may be used in conjunction with rotation normalization, which rotates the hand in the depth map so that after the rotation, the hand base is pointing down, and the fingers are pointing up. In one embodiment, rotation normalization is performed by finding the angle of the line connecting the location of the wrist and the center of mass of the hand. The wrist location can be derived by estimation from a previous frame, or by estimation based on the current frame achieved by other means, such as the learning-based full-body pose estimation method described in the above-mentioned U.S. patent application Ser. No. 13/229,727. The transformation that rotates the hand to the desired direction is calculated based on the angle of the line.

Computer 24 chooses patch centers over the area of the hand, at a patch selection step 121. An example of one possible set of tested patch centers is shown in FIG. 4A. The computer then scans and processes many depth patches from the input depth map, in a patch extraction step 122. For each patch, the computer calculates a respective descriptor, typically in the form of a vector, based on depth, edge, and/or ridge statistics, as described above. The patches extracted from the input depth maps are referred to hereinbelow as "query patches," and their descriptors as "query descriptors."

For each query descriptor, computer 24 retrieves a certain number (K) of patches with similar descriptors from database 25, in a neighbor finding step 124. At this step, the computer may, for example, use an Approximate K-Nearest-Neighbors (ANN) method, of which several are known in the art. For instance, the computer may apply a tree-based method, as described by Arya et al., in "An Optimal Algorithm for Approximate Nearest Neighbor Searching in Fixed Dimensions," *Journal of the ACM* 45, pages 891-923 (1998); or by Muja and Lowe, in "Fast Approximate Nearest Neighbors with Automatic Algorithm Configuration," *International Conference on Computer Vision Theory and Applications* (VISAPP'09), 2009. Alternatively, the computer may apply a hash-based ANN method, as described by Gionis et al., in "Similarity Search in High Dimensions via Hashing," *Proceedings of the 25th Very Large Database (VLDB) Conference* (1999); or by Datar et al., in "Locality-Sensitive Hashing Scheme Based on p-Stable Distributions," *Proceedings of the Symposium on Computational Geometry* (2004). All of the above-mentioned publications are incorporated herein by reference. Each of the neighbor descriptors retrieved from the database is associated with a corresponding set of stored vectors pointing from the stored patch center to all the relevant anatomical landmarks. The computer loops over the patches in this manner until done, in a patch iteration step 125.

In real-life situations, matching and pose estimation may be complicated by occlusion of the hand by another object in the depth map, by the user's other hand, or by other nearby people. When the hand is fully occluded, its pose is unknown. On the other hand, when the occlusion is partial, there may be sufficient information in the part of the hand that is visible to estimate the pose of all or most of the joints or other landmarks in the hand. Occlusions cause added difficulty, however, because they may change the local visibility of certain patches, resulting in the retrieval of irrelevant patches from the database and adding noise to the estimated locations of the anatomical landmarks of the hand.

Potential occlusions may be detected during segmentation step 120, by locating connected components among the depth pixels that are not connected to the hand component and whose depths are smaller than the depth of the nearest hand pixels. Pixels in such areas can be marked on the depth map as occluding. To allow pose estimation of a partially occluded hand, the computer may ignore local information in such occluded areas and base its estimation only on non-occluded information. For example, the computer may entirely ignore patches that contain occluding pixels, or at least patches that contain significant weighted proportions of occluding pixels (particularly pixels near the center of the patch, as the density of bins is higher there).

Another option is to make the decision more local, by including patches with occluding pixels while ignoring bins with such pixels. This approach can be implemented by uniquely marking features associated with such occluded bins. During neighbor finding step 124, the marked features contribute a fixed, small, one-dimensional distance to the full n-dimensional distance between the searched and the retrieved patch, whereas features associated with non-occluded bins contribute the true one-dimensional distance between the searched and retrieved values associated with the feature.

Next, in a location estimation step 126, computer 24 finds the estimated locations of anatomical landmarks, such as the base of the hand, finger joints, or fingertips, based on the distance vectors retrieved from the database in step 124. For the case of joints, it can be advantageous to process the joints in a hierarchical order, beginning with joints closer to the palm, and finding their locations first. These joint locations are then used progressively in finding the more external joints, proceeding outward to the fingertips. Alternatively, the joints may be processed in any other suitable order.

For the current landmark, the computer accumulates location votes (hints) from the neighbor patches that were retrieved from the database. The 3D vector distance of the ground-truth landmark location (read from the database for each retrieved patch) relative to the center of the retrieved patch is applied relative to the center position of the query patch. In other words, assuming a query patch with center location (x,y,z) was found to match a retrieved patch with center location at (X,Y,Z), and the ground-truth location of a given landmark relative to the center of the retrieved patch was at a distance $(D_x,D_y,D_z)$ from (X,Y,Z), this combination of query and retrieved patches will "vote" for a landmark location of $(x+D_x, y+D_y, z+D_z)$ in the current input depth map.

Computer 24 calculates a respective weight for each of these votes. The weight represents the relevance, or confidence value, to be assigned to each vote. The weight may be based on various factors, including:

1. The $L_2$ distance (similarity) between the query and retrieved descriptors.
2. The distance between the patch center and the landmark location for the retrieved patch.
3. For joints, the distance in the input depth map between the (already estimated) location of a "parent" joint (in the hierarchical body model) and the center of the query patch.
4. The distance between the estimated location of the current landmark J based on the current query result and the expected location of J based on its location and velocity estimated from previous depth map frames.
5. The variance value $V_{P,J}$ with respect to the location of J that was calculated during the learning phase for the retrieved patch.
6. For joints, the difference between the current estimated bone length and an expected bone length. (The distance between the already-calculated location of the "parent" joint of the bone and the estimated location of the current joint J of the bone is calculated based on the current query result and is used to estimate the length of the bone between the parent and child joints. The expected bone length is estimated based on many former frames and known anatomical hand proportions. The weight is an increasing function of the difference.)
7. For bones, the difference between the angle of the current bone and the expected angle of the bone, as constrained by the other bones that are more proximal to the palm and whose angle was previously estimated, along with the anatomical limitations of the hand. For example, the top bone of the finger has only one degree of freedom with respect to the middle bone.

For each of the above factors, the weight decreases as the factor itself increases.

A possible formulation of the weights is presented in the above-mentioned U.S. patent application Ser. No. 13/229,727. This weight formula and other aspects of the pose estimation process may be adapted, mutatis mutandis, to the needs and constraints of hand pose estimation.

Additionally or alternatively, other factors may be used in computing the weights of votes by different patches. For example, computer 24 may assign reliability weights (or reliability values) to the landmark locations based on factors in the depth map or derived landmark locations themselves indicating that certain votes are likely to be unreliable. For example, anatomical constraints on finger joint bending angles may also be taken into account in the weight computation. In other words, joint configurations that are physiologically reasonable, in terms of meeting anatomical constraints, may receive relatively high weights, while configurations that are physiologically improbable receive low weights or may be excluded altogether.

The landmark locations found at step 126 define a point cloud, as illustrated in FIG. 4B for the fingertip joint, representing a range of possible locations of the current landmark J. Each point has an associated weight, which is calculated as explained above. Although any single location vote may be inaccurate, the collection of votes is typically much more informative.

Returning now to FIG. 6, in a landmark location assignment step 128, computer 24 finds a location in the point cloud where the weighted density of proximal points is maximal, and assigns it to be the estimated location of the landmark. In other words, the computer finds a local mode of the 3D distribution of weighted points in the cloud. Although it is also possible to find the global weighted center of mass, the inventor has found that the point cloud often comprises several locally-dense areas. Therefore, choosing the location where the weighted density of local points is maximal typically gives a superior approximation of the actual landmark location. Various methods may be used to find the local mode of the weighted point cloud, such as the weighted "mean-shift" algorithm described by Comaniciu and Meer, in "Mean Shift: A Robust Approach Toward Feature Space Analysis," *IEEE Transactions on Pattern Analysis and Machine Intelligence* (IEEE) 24(5), pages 603-619 (2002), which is incorporated herein by reference.

After finding the current landmark location, computer 24 repeats steps 126 and 128 for the subsequent landmarks in the hierarchy, through a landmark iteration step 130, until the locations of all landmarks have been found. Thus, the entire hand skeleton is efficiently reconstructed, as illustrated in FIG. 3.

The hand pose may be described at this stage in terms of a simplified hand posture description language, which is presented in an Appendix below. Alternatively or additionally, when ground-truth information from the learning stage is expressed in terms of this sort of language, as noted earlier, the hand pose may be found in the detection phase in terms of these hand posture features, instead of or in addition to the location-based detection methods that are described above.

The landmark locations determined at step 128 may be given for a hand of "standard" size, located at a "standard" distance from the camera and oriented in a "standard" orientation (typically with the base of the palm at the bottom). A reverse transformation to the one applied on the original depth map may now applied to the estimated joint locations, so that the output matches the original depth map.

Optionally, in the course of this process, the distances between the landmarks may be compared and refined in an iterative scaling process, in order to account for variations in hand size and build among different users. A method for scale adjustment that may be used in this context is described in the above-mentioned U.S. patent application Ser. No. 13/229,727.

Although embodiments of the present invention are described above, for the sake of clarity, in the context of the particular components of system 20, the principles of the present invention may similarly be applied in conjunction with substantially any other type of depth mapping system. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX

Hand Posture Description Language

This Appendix describes a hand posture description language, which may be used both in the training stage and at the detection stage.

Posture is described by a set of positions of its fingers. Each finger may have 5 basic positions:
Clenched (0)
½ Open (1)
½ Open & abducted (2)
Open (3)
Open & abducted (4)

This set of finger positions gives $5^5=3125$ combinations. Not every combination represents a valid posture. Examples of invalid postures include:

| Finger | Thumb | Index | Middle | Ring | Pinky |
|---|---|---|---|---|---|
| Position | 3 open | 3 open | 3 open | 3 open | 0 Clenched |

Each posture may be represented by a 15 bit code, representing five 3-bit numbers. As noted above, not every 15 bit sequence describes a posture.

Posture Examples

| | Finger | | | | |
|---|---|---|---|---|---|
| | Thumb | Index | Middle | Ring | Pinky |
| 1. OK Position | 1 | 1 | 2 | 2 | 2 |
| 2. Victory Position | 0 | 2 | 2 | 0 | 0 |
| 3. Thumbs up Position | 3 | 0 | 0 | 0 | 0 |
| 4. Obscenity Position | 0 | 0 | 2 | 0 | 0 |
| 5. Rock-n-Roll (devil) Position | 0 | 3 | 2 | 0 | 3 |
| 6. Point Position | 0 | 3 | 0 | 0 | 0 |
| 7. Shoot | | | | | |

-continued

| | Finger | | | | |
|---|---|---|---|---|---|
| | Thumb | Index | Middle | Ring | Pinky |
| Position Or | 3 | 3 | 0 | 0 | 0 |
| Position 8. Call me | 3 | 3 | 3 | 0 | 0 |
| Position 9. Fist | 3 | 0 | 0 | 0 | 3 |
| Position 10. Come here | 0 | 0 | 0 | 0 | 0 |
| Position Or | 0 | 1 | 0 | 0 | 0 |
| Position 11. Salute | 1 | 1 | 1 | 1 | 1 |
| Position 12. Tiger's paw | 4 | 0 | 0 | 0 | 0 |
| Position 13. Hi-Five | 2 | 3 | 2 | 2 | 2 |
| Position 14. Three | 3 | 4 | 4 | 4 | 4 |
| Position 15. Four | 3 | 4 | 4 | 0 | 0 |
| Position | 0 | 4 | 4 | 4 | 4 |

The invention claimed is:

1. A method for processing data, comprising:
receiving a depth map of a scene containing a human hand, the depth map comprising a matrix of pixels having respective pixel depth values, the hand including fingers having multiple joints;
extracting from the depth map information based on the depth values in a plurality of positions distributed over the human hand;
processing the information in order to estimate respective candidate positions of the finger joints; and
estimating a pose of the human hand by choosing a combination of the positions of the finger joints, responsively to anatomical constraints on bending angles of the finger joints, that gives a hand configuration that is most anatomically probable among the candidate positions.

2. The method according to claim 1, wherein estimating the pose comprises applying kinematics based on the anatomical constraints in processing the information.

3. The method according to claim 1, wherein estimating the pose comprises expressing the pose in terms of a hand posture description language.

4. The method according to claim 3, wherein the hand posture description language comprises assigning one of a set of positions to each finger of the hand so as to define postures of the hand.

5. The method according to claim 4, wherein defining postures of the hand comprises defining one or more invalid postures of the hand, and wherein estimating the pose of the hand comprises excluding the one or more invalid postures.

6. The method according to claim 1, and comprising normalizing a depth of the depth map by finding a representative depth coordinate of the human hand in the depth map and projecting a point cloud derived from the depth map responsively to the representative depth coordinate, and applying the normalized depth in estimating the pose.

7. The method according to claim 1, wherein estimating the pose comprises finding respective locations of landmarks of the human hand, and wherein the method comprises calibrating a scale of the human hand by finding a distance between the locations of the landmarks and scaling the depth map responsively to the distance, and applying the calibrated scale in estimating the pose.

8. The method according to claim 1, wherein receiving the depth map comprises receiving a sequence of depth maps, and wherein estimating the pose comprises tracking movement of the human hand over multiple frames in the sequence.

9. The method according to claim 8, and comprising controlling a computer application responsively to the tracked movement.

10. Mapping apparatus, comprising:
an imaging assembly, which is configured to provide a depth map of a scene containing a human hand, the depth map comprising a matrix of pixels having respective pixel depth values, the hand including fingers having multiple joints; and
a processor, which is configured to extract from the depth map information based on the depth values in a plurality of positions distributed over the human hand, to process the information in order to estimate respective candidate positions of the finger joints, and to estimate a pose of the human hand by choosing a combination of the positions of the finger joints, responsively to anatomical constraints on bending angles of the finger joints, that gives a hand configuration that is most anatomically probable among the candidate positions.

11. The apparatus according to claim 10, wherein the processor is configured to apply kinematics based on the anatomical constraints in processing the descriptors.

12. The apparatus according to claim 10, wherein the processor is configured to express the pose in terms of a hand posture description language.

13. The apparatus according to claim 12, wherein the hand posture description language assigns one of a set of positions to each finger of the hand so as to define postures of the hand.

14. The apparatus according to claim 13, wherein the processor is configured to define one or more invalid postures of the hand, and to exclude the one or more invalid postures in estimating the pose of the hand.

15. The apparatus according to claim 10, wherein the processor is configured to normalize a depth of the depth map by finding a representative depth coordinate of the human hand in the depth map and to project a point cloud derived from the depth map responsively to the representative depth coordinate, and to apply the normalized depth in estimating the pose.

16. The apparatus according to claim 10, wherein the processor is configured to find respective locations of landmarks of the human hand, to calibrate a scale of the human hand by finding a distance between the locations of the landmarks, to scale the depth map responsively to the distance, and to apply the calibrated scale in matching the descriptors and in estimating the pose.

17. The apparatus according to claim 10, wherein the imaging assembly is configured to provide a sequence of depth maps, and wherein the processor is configured to track movement of the human hand over multiple frames in the sequence.

18. The apparatus according to claim 17, wherein the processor is configured to control a computer application responsively to the tracked movement.

19. A computer software product, comprising a computer-readable medium in which program instructions are stored, which instructions, when read by a computer, cause the computer to receive a depth map of a scene containing a human hand, the depth map comprising a matrix of pixels having respective pixel depth values, the hand including fingers having multiple joints, wherein the instructions cause the computer to extract from the depth map information based on the depth values in a plurality of positions distributed over the human hand, to process the information in order to estimate respective candidate positions of the finger joints, and to estimate a pose of the human hand by choosing a combination of the positions of the finger joints, responsively to anatomical constraints on bending angles of the finger joints, that gives a hand configuration that is most anatomically probable among the candidate positions.

20. The product according to claim 19, wherein the instructions cause the computer to express the pose in terms of a hand posture description language.

* * * * *